(12) United States Patent
Mariasov

(10) Patent No.: US 10,373,132 B2
(45) Date of Patent: Aug. 6, 2019

(54) COMPUTERIZED SOCIAL SHARING AND TRADING SYSTEM, DEVICE, AND METHOD BASED ON THE USE OF VIRTUAL CONSIDERATION

(71) Applicant: Alexander Mariasov, Las Vegas, NV (US)

(72) Inventor: Alexander Mariasov, Las Vegas, NV (US)

(*) Notice: Subject to any disclaimer, the term of this patent is extended or adjusted under 35 U.S.C. 154(b) by 416 days.

(21) Appl. No.: 15/180,622

(22) Filed: Jun. 13, 2016

(65) Prior Publication Data
US 2017/0024712 A1    Jan. 26, 2017

Related U.S. Application Data

(60) Provisional application No. 62/194,775, filed on Jul. 20, 2015.

(51) Int. Cl.
*G06Q 30/00* (2012.01)
*G06Q 20/10* (2012.01)
*G06Q 30/08* (2012.01)
*G06Q 30/02* (2012.01)
(Continued)

(52) U.S. Cl.
CPC ....... *G06Q 20/102* (2013.01); *G06Q 30/0277* (2013.01); *G06Q 30/08* (2013.01); *G06Q 40/04* (2013.01); *G06Q 50/01* (2013.01)

(58) Field of Classification Search
CPC ...... G06Q 30/00; G06Q 20/102; G06Q 30/08; G06Q 30/0277; G06Q 40/04; G06Q 50/01
See application file for complete search history.

(56) References Cited

U.S. PATENT DOCUMENTS

| 5,959,662 A * | 9/1999 | Shaffer | H04N 7/15 348/14.01 |
| 6,594,640 B1 * | 7/2003 | Postrel | G06Q 20/06 705/14.27 |

(Continued)

OTHER PUBLICATIONS

Ben Fung et al. "Understanding Platform-Based Digital Currencies" Bank of Canada Review Spring 2014. Retrieved from https://www.bankofcanada.ca/wp-content/uploads/2014/05/boc-review-spring14-fung.pdf (Year: 2014).*

(Continued)

*Primary Examiner* — Naeem U Haq
(74) *Attorney, Agent, or Firm* — Carrie Stroup

(57) ABSTRACT

A computerized social sharing and trading system, method, device, and product based on virtual consideration that allows a user to sign up and create a profile that is stored in a database. The user is given a welcoming amount of virtual currency that allows trading for goods and services provided by other members of the system. The user can specify customized parameters that may be used to raise very specific queries and to specify location, fees, condition, etc. to allow the user to thoughtfully select the goods or services desired. One embodiment allows users to create groups for specific tasks or goods so that only those people relating to the selected group will be contacted. Users are able to personalize their profiles and offer-pages and will be charged a small virtual fee for this option. In some embodiments, video conferencing is integrated to allow services to be offered virtually.

15 Claims, 6 Drawing Sheets

(51) Int. Cl.
*G06Q 40/04* (2012.01)
*G06Q 50/00* (2012.01)

(56) References Cited

U.S. PATENT DOCUMENTS

| | | | | |
|---|---|---|---|---|
| 6,865,260 | B1* | 3/2005 | Meadows | H04M 3/53366 |
| | | | | 379/67.1 |
| 7,085,812 | B1* | 8/2006 | Sherwood | H04L 12/5875 |
| | | | | 709/206 |
| 7,881,987 | B1* | 2/2011 | Hart | G06Q 10/087 |
| | | | | 705/26.8 |
| 9,445,137 | B2* | 9/2016 | Unice | H04N 19/61 |
| 2001/0056395 | A1* | 12/2001 | Khan | G06Q 20/00 |
| | | | | 705/37 |
| 2002/0032668 | A1* | 3/2002 | Kohler | G06Q 30/06 |
| | | | | 705/401 |
| 2002/0052830 | A1* | 5/2002 | Sakamoto | G06Q 30/02 |
| | | | | 705/37 |
| 2002/0077890 | A1* | 6/2002 | LaPointe | G06Q 30/02 |
| | | | | 705/14.28 |
| 2004/0150712 | A1* | 8/2004 | Le Pennec | H04N 7/152 |
| | | | | 348/14.01 |
| 2006/0259350 | A1* | 11/2006 | Ryan | G06Q 20/203 |
| | | | | 705/7.31 |
| 2010/0262505 | A1* | 10/2010 | Fields | G06Q 20/10 |
| | | | | 705/26.1 |
| 2011/0106662 | A1* | 5/2011 | Stinchcomb | G06Q 30/06 |
| | | | | 705/26.43 |
| 2012/0066286 | A1* | 3/2012 | Heredia | G06Q 10/10 |
| | | | | 709/201 |

OTHER PUBLICATIONS

John D. Sutter, "Virtual currencies' power social networks, online games" May 19, 2009. Retrieved from http://www.cnn.com/2009/TECH/05/19/online.currency/index.html (Year: 2009).*

Irv Englander "The Architecture of Computer Hardware, System Software, and Networking" Fourth Edition, Copyright © 2009 John Wiley & Sons, Inc. ISBN-13: 978-0471-71542-9 (Year: 2009).*

Joshua Stern, Ph.D "Web Basics Workshop" Copyright 1996-2005. Retrieved from www.wlac.edu/online/documents/webbasics.pdf (Year: 2005).*

* cited by examiner

COMPUTERIZED SOCIAL SHARING AND TRADING SYSTEM, DEVICE, AND METHOD BASED ON THE USE OF VIRTUAL CONSIDERATION

RELATED APPLICATIONS

This application claims priority to Provisional U.S. patent application Ser. No. 62/194,775 filed Jul. 20, 2015.

FIELD OF THE INVENTION

This disclosure relates to an online computer system allowing users to exchange goods and services using a virtual currency.

COPYRIGHT NOTICE

A portion of the disclosure of this provisional patent application document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TRADEMARKS DISCLAIMER

The product names used in this document are for identification purposes only. All trademarks and registered trademarks are the property of their respective owners.

BACKGROUND OF THE INVENTION

Many people recognize that income inequality gives rise to social unrest, and this is of special interest to politicians and social planners. Historically, people lived by plying their labor or skill for the things they need. In this economic system, a carpenter made a deal with a butcher allowing the carpenter to get food and the butcher to get furniture. Of course monetary systems have mostly replaced the older barter system; however, with the use of mediums of exchange, many people find it difficult get the things they need because although they may have goods and skills, they do not have the money to buy the things they want.

There is a need for a user friendly computerized system of trading goods and services that equalizes the disparity between the amount of money an individual has and the basic need and desire to improve their position in life.

SUMMARY OF THE INVENTION

The present invention comprises a computerized social sharing and trading system, method, device, and computer program product installed on the device, that is based on virtual consideration (e.g. digital currency, coin, points, etc.) to enable a user-buyer or user-seller of products comprising tangible and intangible goods and services to trade with other system users without exchanging real world currency (e.g. credit/debit card transactions, bank transfers, cash, etc.).

The computer system allows a user to sign up and create a profile that is stored in a remote computer system database. The user is given a welcoming amount of virtual currency that allows trading for goods and services provided by other members of the system—meaning the system server deposits a gift of virtual currency into the user's system account that is stored on the system database.

The user can specify customized parameters that may be used to raise very specific queries and to specify location, fees, condition, etc. to allow the user to thoughtfully select the goods or services desired. One embodiment allows users to create groups for specific tasks or goods so that only those people relating to the selected group will be contacted.

Users are able to personalize their profiles and offer-pages and may be charged a small virtual fee for this option. Users can access the system server remotely via a mobile application running on the user's electronic computing device (e.g. smartphone, tablet, laptop, etc.), and the user can log into a system website, or a combination of both for different tasks.

System users communicate via a network comprising a variety of technologies, but the actual exchange of goods and services for virtual currency between system users is done via the computer system server. Therefore, users can communicate directly outside of the system (e.g. via third party hosted user-to-buyer emails, text, video conferencing, etc.); or within the system's emails, text, chat-rooms etc., and with or without video conferencing. But the actual posting of offers for goods and services on a user's webpage, and the acceptance of the user's offer, and the payment from the buyer to the user in the form of virtual currency (e.g. points), is conducted via the system server within the user and buyer computer system accounts.

The system also comprises a "monitoring feature" that allows the buyer to watch the seller perform the service they have purchased, and in "real-time". The seller-user is required to wear a body camera (e.g. GoPro®), or otherwise be filmed while they are performing the services contracted for (e.g. smartphone video camera). The live-feed, or pre-recorded event, is transmitted via a wireless or satellite network to the system server and onto one or more buyers, or directly to the user electronic computing device. By way of non-limiting examples, the seller-user may be filmed performing a physical task (e.g. babysitting, performing a comedy routine, etc.); or the seller-user may transmit a live-feed or pre-recorded video of an event they have engaged in (e.g. attending a lecture while taking copious notes; traveling to a tourist spot; participating in an extreme sport; etc.).

In an embodiment, the present invention comprises a computer program product that may contain instructions that, when executed, perform one or more methods, such as those described herein. Smartphone mobile app: for example, the present invention further comprises a computer program product wherein a user electronic computing device is communicatively coupled to a remote or cloud based server, and having installed within the device memory is a downloadable mobile app capable of enabling a registered user to purchase products comprising goods and services from other registered users of the server without using currency. With the mobile app, the user electronic computing device is able to: receive user input (e.g. touchscreen and/or keystroke); and wirelessly transmit and display electronic communications retrieved from the server, such as— advertisements for a product; bids for the purchase of the product; negotiations between a product seller and a potential buyer; and the confirmation of a transfer of points from a buyer to a seller system account as a form of payment, wherein the points may be re-used by the seller to purchase another product, and wherein the buyers and sellers are registered users of the server.

The present invention further comprises an article (of manufacture), or a computer system, or an electronic computing device, comprising a storage medium storing instructions readable by a processor-based system that, if executed by a processor enables the processor to: electronically transfer one or more earned points from a buyer's account on a computer system, to a seller's account on the computer system as a form of payment for a seller's product; wherein a buyer and a seller are registered users of the computer system to sell a first product using earned points and without using monetary currency as a form of payment; wherein the seller may re-use the earned points to buy a second product advertised on the computer system; and wherein the first and second product are tangible or intangible goods or services, or any combination thereof. The articles or the computer system may further comprise generating and transmitting an electronic message comprising an offer for sale for the first or second product from a seller to a plurality of potential buyers.

Other features and advantages of the instant invention will become apparent from the following description of the invention which refers to the accompanying drawings.

DETAILED DESCRIPTION OF THE INVENTION

Figure 1:
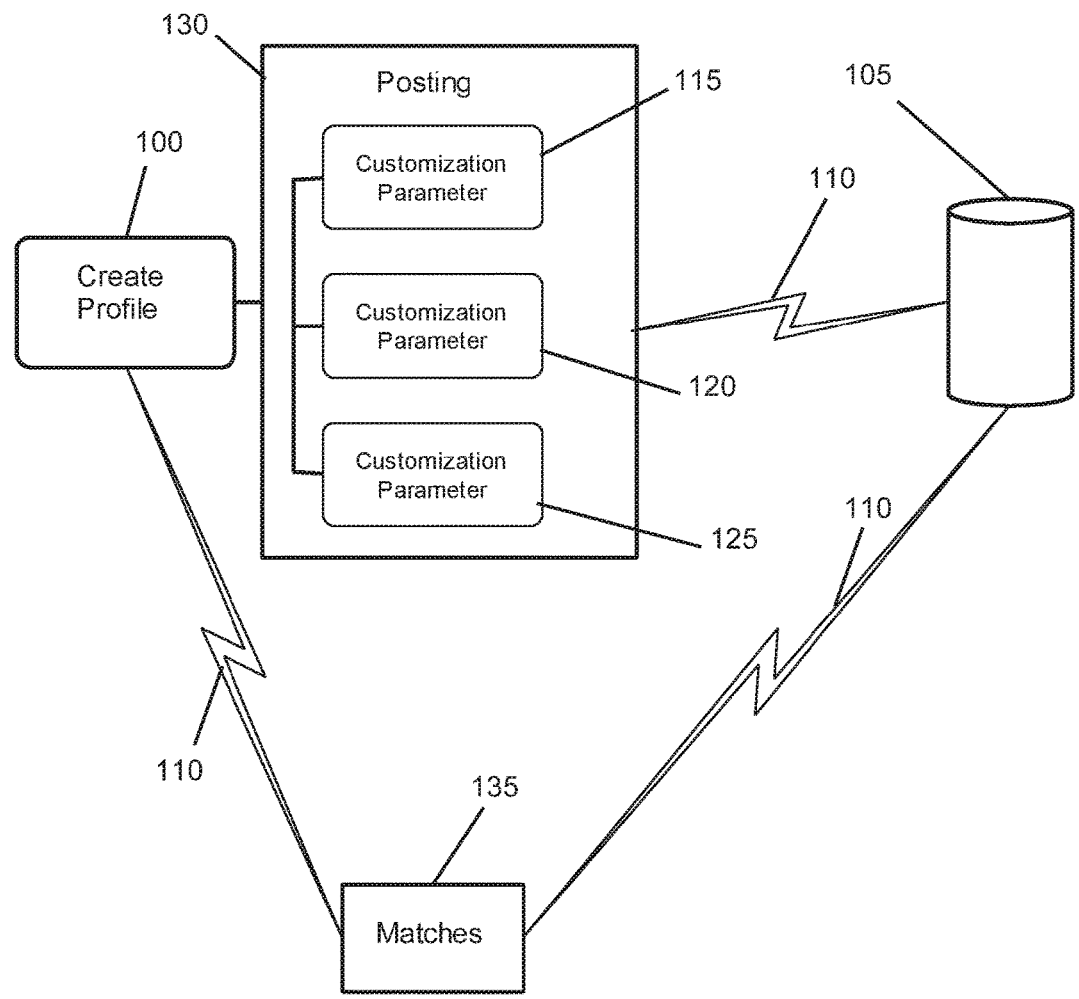
FIG. 1 is a system diagram of a social sharing and trading system based on virtual consideration utilizing a network.

Embodiments of the present invention are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Glossary of Terms

As used herein, the term "Electronic Computing Device" refers to any electronic device comprising a central processing unit (i.e. processor) with the ability to transmit and receive electronic communications comprising via a network connectivity, such a laptop or desktop computer, a tablet, a smartphone, a personal digital assistance (PDA) device, etc.

As used herein, the term "Network" refers to any public network such as the Internet or World Wide Web, or any public or private network as may be developed in the future, which provides a similar service as the present Internet, cellular service, etc. The users' electronic computing device, and the remote or cloud based system server may connect to the network via a variety of methods such as a phone modem, wireless (cellular, satellite, microwave, infrared, radio, etc.) network, Local Area Network (LAN), Wide Area Network (WAN), or any such means as necessary to communicate to the remote or cloud based server computer that is connected directly or indirectly to the Network.

As used herein, the term "Virtual Consideration" and "Virtual Currency" refers to the "App coins" of the present invention that are used worldwide without requiring an exchange rate between countries. They are also "points" that are stored in a seller's account, wherein the amount of points correlates with the value of the seller's product.

As used herein, the term "Computerized System" or "Computer System" or "System" may be used to claim all aspects of the present disclosure wherein it refers to the entire configuration of hardware and software one or more embodiments. In one embodiment, the "system" or "computerized system" comprises a user electronic computing device with network connectivity comprising the mobile app of the present invention installed or accessible thereon via the network. In another embodiment, the system comprises a client-server architecture with at least one user electronic computing device with a network connectivity and communicating with a remote or co-located, or cloud based, system server via a network, wherein the computer program product of the present invention is installed on the system server and electronically communicates with the user's device over the network (e.g. the Internet). And/or the user's electronic computing device may have modules of the computer program product (e.g. a mobile app) of the present disclosure installed to communicate with the system server and access the user's online account.

As used herein, the term "non-transitory machine-readable storage medium", refers to any hardware and mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM) chip; random access memory (RAM) hardware device; magnetic disk storage media device; optical storage media device; flash memory devices; etc.) that is used or usable with a computer or machine (e.g. user electronic computing device, remote server, etc.).

As used herein, the term "User" refers to a person who is registered on the system with an account stored on the system database, and is authorized to sell and/or buy products comprising tangible and non-tangible goods and services from other registered system users.

As used herein, the term "Matching Events" refers to the remote or cloud based computer system determining that a user seller and user buyer have reached an agreement on the contractual terms for the exchange of a product (goods and/or services) in consideration for a specified quantity of system points, or App coins, being transferred from the buyer's to a seller's system account.

As used herein, the term "Customization Parameters" refers to conditions set by the user buyer, user seller, or the computer system automatedly, that restricts or defines terms of the contract between the seller and buyer, e.g. maximum shipping weight, price range, new versus used product, potential buyers invited to receive offer for sale, etc.

As used herein, the term "Computer Program Product" refers to the computer code (software) of the present invention (e.g. virtual consideration and accounting module, customization parameters module, etc.) that is encoded in a computer readable medium, and which causes a computer processor to perform the encoded steps.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to the FIGS. 1-5B, a social sharing and trading system based on virtual consideration is shown starting with a user creating a profile by inputting data into the display on their user electronic computing device 100. In the profile, various information is included such as, but not limited to, pictures, photos, videos, status, etc. of products comprising tangible and intangible goods and services that the user is offering, as well as contact information to assist other system user's (e.g. buyers) to identify and communicate with the user. Information may be shared between all members or just a selected subset.

In another embodiment, the user may also post to the remote or cloud based computer system the products (i.e. tangible and intangible goods and/or services) that they wish to buy from another system user (e.g. seller).

As illustrated in FIG. 1, the user buyer and seller are able to post to the system using a posting query 130 that may be user defined, or system defined, by using one or more of customization parameters 115, 120 and 125 which are stored in a user's account on the system database 105 using a communication network 110. Of course the system is not limited to three customization parameters; this is just a representative listing. Customization parameters 115, 120 and 125 include things like geographic information including how far away they are willing to ship/pickup a product or travel to provide a service, how many App coins they are willing to pay or accept, etc.

Matching events 135 are displayed to the user using communication network 110 (e.g. email, text, SMS sent via the Internet or a cellular network). A matching event comprises a notification from the computer system that the seller and buyer have reached an agreement of terms of a contract for the exchange of a product (goods and/or services) in consideration of system points being transferred from the buyer's to a seller's system account.

The basis for consideration utilized by the computer system is a virtual currency that is accounted for by the computer system and stored in a user's account on the database 105. The name of the currency may be "App coins" or "Points" or other term that is defined by the computer system. The users all agree to trade using the "App coins", or the like, and this allows users from all over the world to participate on an equal playing field since all users have access to the same consideration; namely "App coins".

User Offer for Sale

Figure 2:
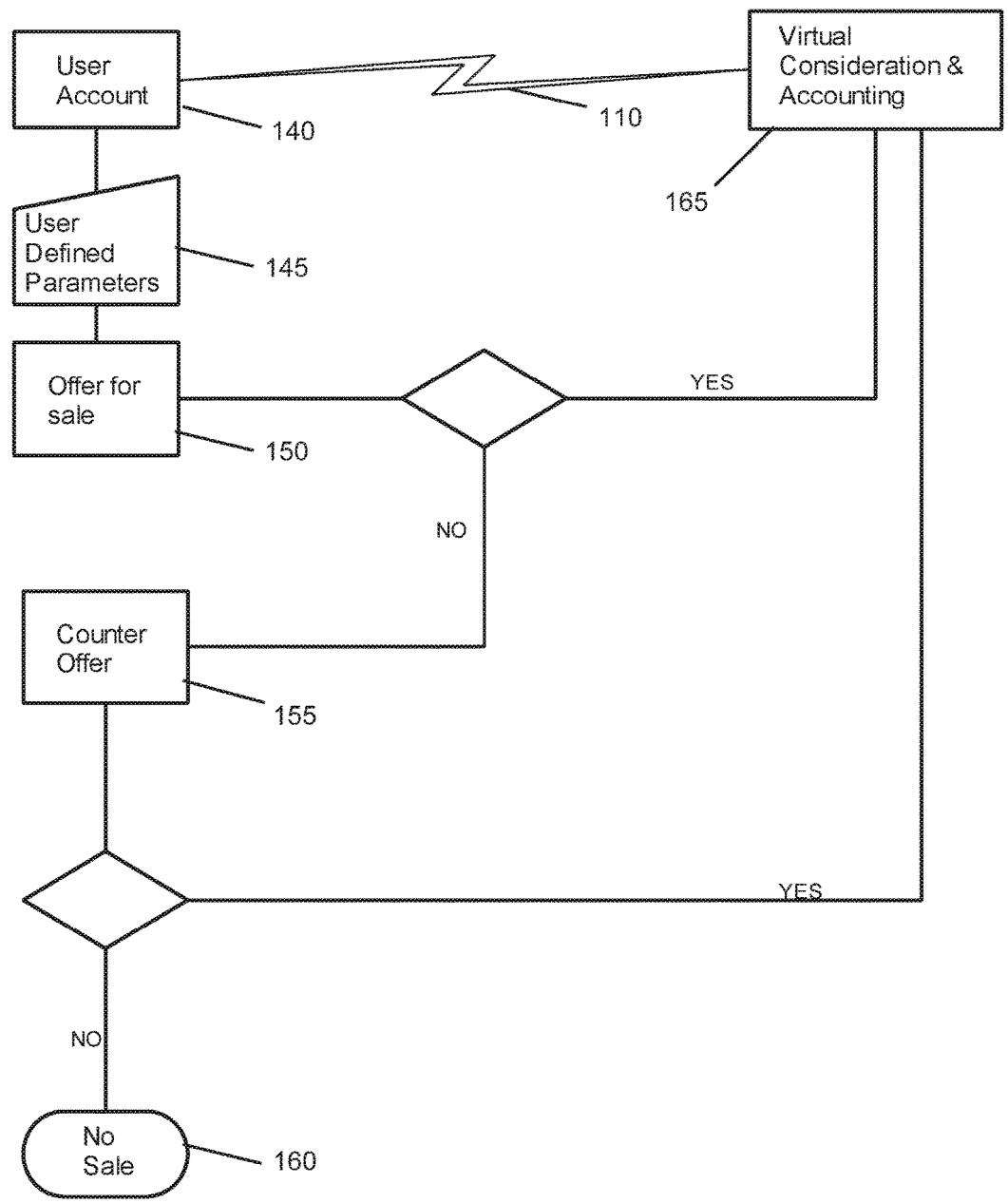
FIG. 2 is a flow diagram of the computer process that a user initiates when making an offer for sale according to an embodiment of a social sharing and trading system based on virtual consideration.

FIG. 2 is a flow diagram of the basic computer system steps and hardware-software components for the user-seller to post an offer for sale of a product (i.e. tangible or intangible goods or service) provided by the user to a buyer who is a register computer system user. Initially, the user-seller sets up a system account 140 that allows the user to interface with the remote computer system. User account 140 may be accessed using a user electronic computing device, such as a laptop or desktop computer, a tablet, a smart phone, etc. or other suitable computing interface. A virtual consideration and accounting module 165 is used to keep track of each member's account and balance of App coins. The user inputs information regarding the offer for sale 150 using a user defined customization parameters module 145 which allows the user to set the amount of App coins they want, condition, video or picture, shipping information, etc. which is then transmitted via the network to the remote computer system which broadcasts the offer to the members of the system. If a member agrees to the offer, the user's account is credited with the agreed upon fee (e.g. points). There can be a bargaining phase where a member submits a counter offer, the user may accept the counteroffer 155, or reject it ending the sale 160, or accepting an offer from another member (user-buyer). Of course this back and forth online negotiations are done in a traditional bargaining method by repeating the process until either an agreement is reached or the sale ends.

User Buys Member's Product

Figure 3:
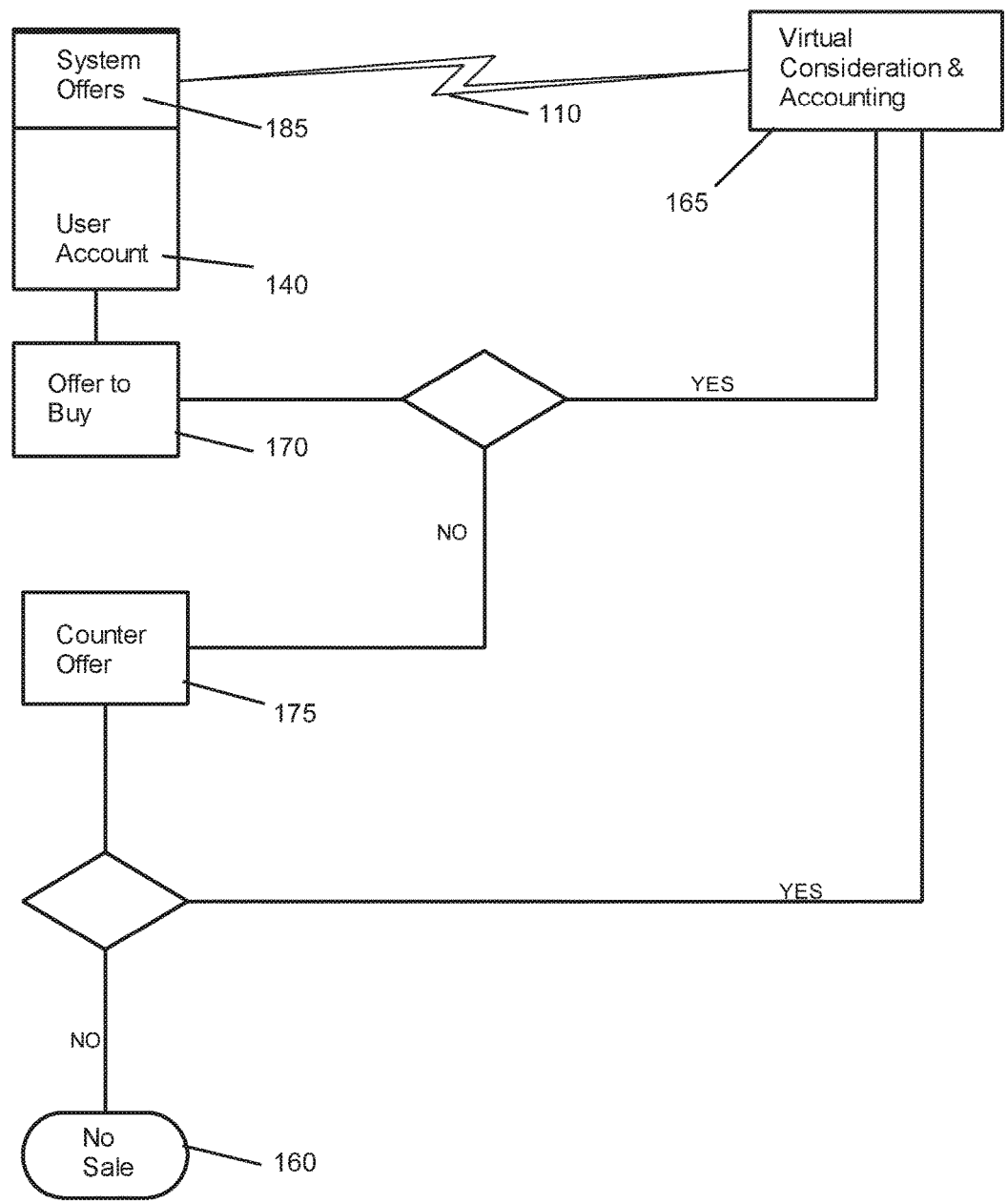
FIG. 3 is a flow diagram of the computer process that a user initiates when making an offer to buy according to an embodiment of a social sharing and trading system based on virtual consideration.

Now referring to FIG. 3, a similar computer flow diagram outlines an offer to buy which starts when a user account 140 is presented with system offers 185 that are broadcast by the computer system to all or a selected subset of all the members. The user makes an offer to buy 170 and if accepted, then the fee is recorded and transferred by the virtual consideration and accounting module 165 and communication network 110. The user may make a counter offer 175 and if accepted, then as above, the fee is transferred. If the member who is selling, rejects the counter offer 175, then there is no sale 160 and the transaction ends. Again, as above, the bargaining process may continue until an agreement is reached or the sale ends.

System Architecture

The present invention generally provides for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Figure 4:
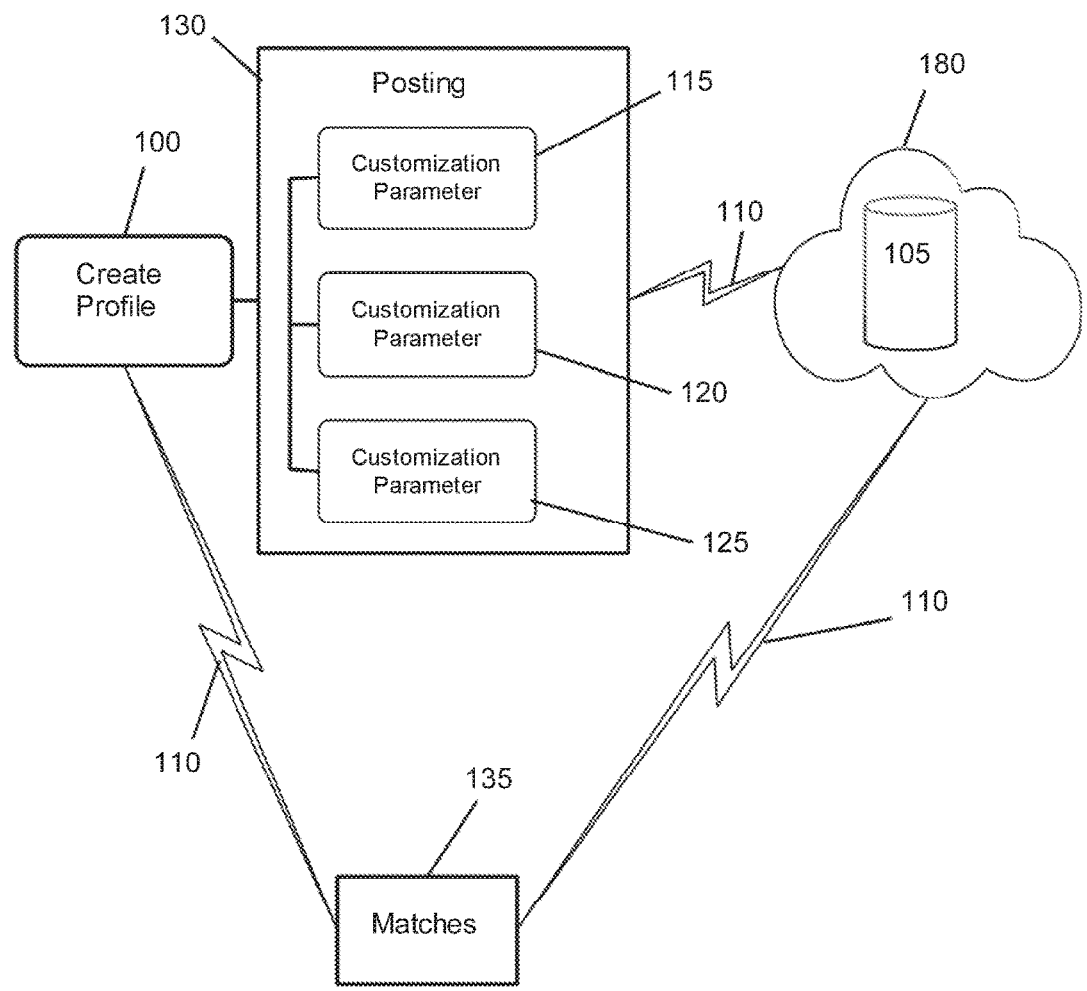
FIG. 4 is a flow diagram of the computer process that a user initiates when making an offer to buy according to the embodiment shown in FIG. 3 of a social sharing and trading system based on virtual consideration utilizing a cloud to store and distribute information.

FIG. 4 illustrates another exemplary system architecture using a cloud based delivery system 180 where the basic functionality remains as described above in FIGS. 1-3. The database 105 comprising buyer and seller system accounts are located in a cloud based platform 180.

Figure 5A:
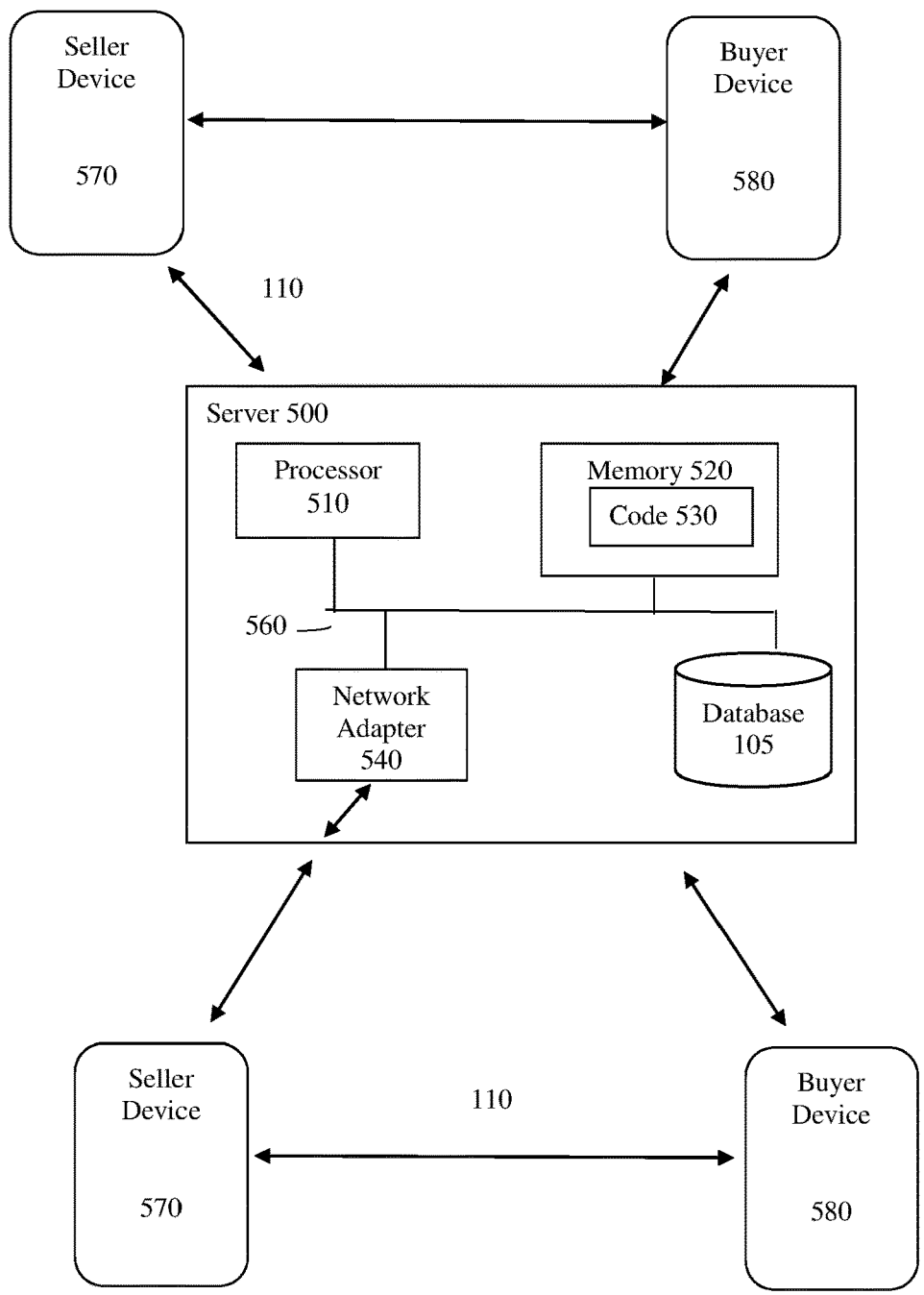
FIG. 5A is a block diagram of exemplary remote computer system communicating via a network with a plurality of buyer and seller electronic computing devices.

FIG. 5A illustrates another exemplary system architecture—as a high level block diagram—of the entire computer system comprising a remote computer system 500 communicating via a network 110 (e.g. the Internet, cellular, etc.) with at least one, or a plurality of user-seller electronic computing devices 570, and at least one, or a plurality of user-buyer electronic computing devices 580. Each computer (e.g. remote system server and user electronic computing device, such as a smartphone) within the "computer system" comprises at least one display device; at least one input device; at least one processor; and at least one memory device which stores a plurality of instructions, which when executed by the at least one processor, cause the at least one processor to operate with the display device and the at least one input device to carry out the methods disclosed herein for online trading without the use of real world currency (e.g. FIGS. 1-4).

As illustrated in FIG. 5A the computer system or server 500 (local or remote), comprises the components: processor 510 that executes the computer program product, otherwise known as code 530, comprising the virtual and consideration accounting module, customization parameter module, etc. and other computer instructions of the present invention that are stored in memory 520; database 105 that stores buyer and seller account records; a network adapter 540 to connect the server 500 to the network 110 (e.g. the Internet); and an interconnect 560 that connects the listed computer components. The database 105 further comprises a storage adapter that allows the server 500 to access a persistent storage, e.g. a Fibre Channel adapter or SCSI adapter.

The processor 510 is a central processing unit (CPU) that controls the overall functions of the computer server 500 by executing software and/or firmware stored in the memory 520; and may comprise one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination thereof.

Furthermore, in FIG. 5A, the memory 520 comprises: random access memory (RAM), read-only memory (ROM) chip, flash memory, or the like, or a combination of such devices. Memory 520 may further store all or part, or be in communication with on user devices 570, 580 via the network 110, the computer program product of the present invention which comprises the code 530 that contains instructions according to the techniques disclosed herein.

And the interconnect 560 represents one or more of: separate physical buses, point-to-point connections, or both that are connected by appropriate bridges, adapters, controllers. By way of non-limiting examples, the interconnect 560 may comprise: a Peripheral Component Interconnect (PCI) bus or PCI-Express bus, a Hyper-Transport or industry standard (ISA) bus, a small computer system interface (SCSI) bus, a universal serial bus (USB), IIC (I2C) bus, or an Institute of Electrical and Electronics Engineers (IEEE) standard 1494 bus (Fireware).

Figure 5B:
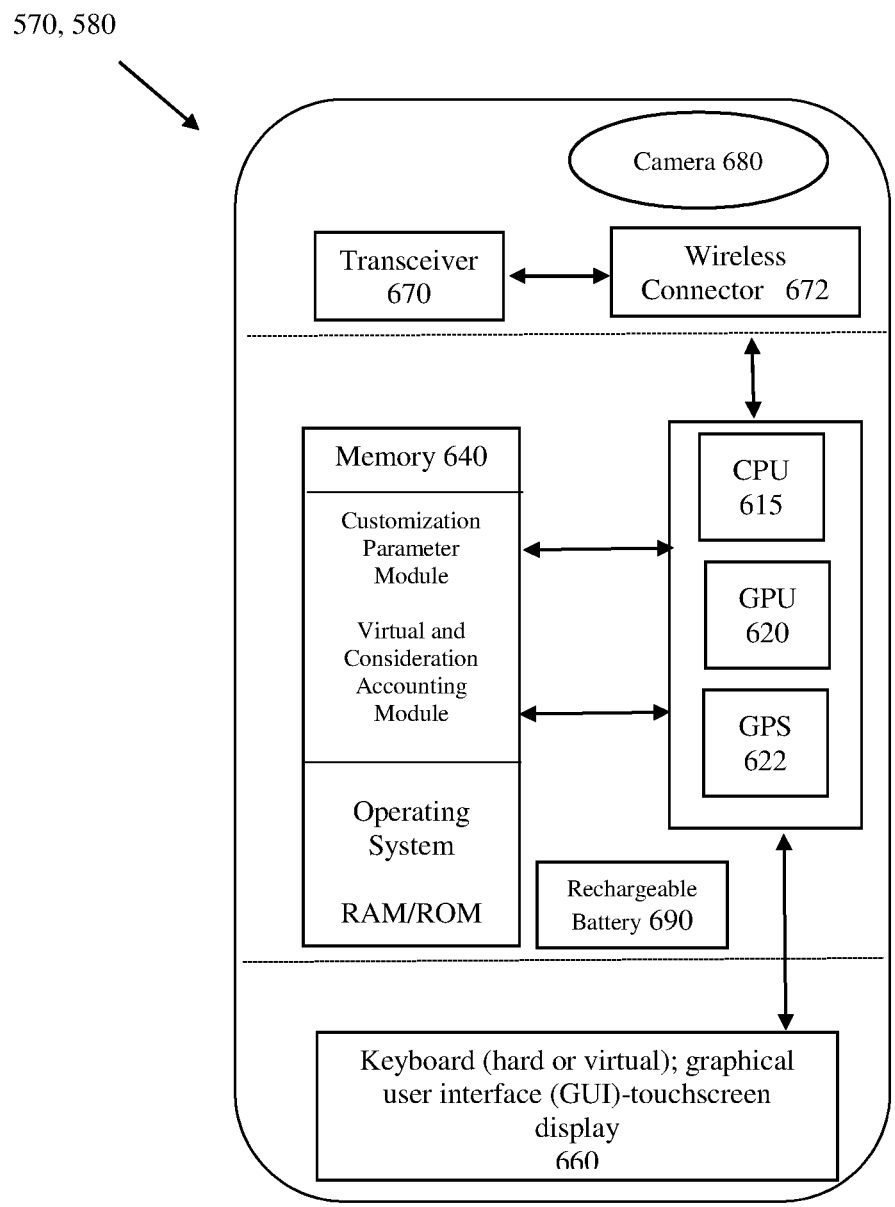
FIG. 5B is a block diagram of a computer program product comprising a user mobile electronic computing device having a mobile app installed to carry out the methods disclosed herein to buy a product using virtual currency.

Computer Program Product as a mobile app: FIG. 5B illustrates a block diagram comprising a user electronic computing device with a mobile app installed thereon of the present invention. The use electronic computing devices 570, 580 may further have installed within the device's memory a module comprising a native application, a web application, or a widget type application to carry out the methods of the embodiments disclosed herein. In one embodiment, a native application (e.g. computer program product) is installed on the device, wherein it is either pre-installed on the device or it is downloaded from the Internet via email and activated with a code generated by the system server. It may be written in a language to run on a variety of different types of devices; or it may be written in a device-specific computer programming language for a specific type of device.

In another embodiment, a web application resides on a system website and is accessed via the network 110. It performs basically all the same task as a native application, usually by downloading part of the application to the user's device 570, 580 for local processing each time it is used. The web application software is written as Web pages in HTML and CSS or other language serving the same purpose, with the interactive parts in JavaScript or other language. Or the web application can comprise a widget as a packaged/downloadable/installable web application; making it more like a traditional application than a web application; but like a web application uses HTML/CSS/JavaScript and access to the Internet. And/or devices 570, 580 may include a web browser running applications (e.g. Java applets or other like applications), comprising application programming interfaces ("APIs") to other software applications running on remote servers that provide, for example, cloud based services and comment posting.

Furthermore, and as illustrated in the block diagram of FIG. 5B, the user electronic computing devices 570, 580, such as a laptop or desktop computer, a tablet, a smartphone, a personal digital assistance (PDA) device, etc. each comprise the following components: an operating system (e.g. Windows, Mac, Unix, Linux based, or the like), a memory (e.g. random access memory (RAM) device, read only memory (ROM) chip, etc.) and software programs or components installed in the memory that are executed by a central processing unit (CPU) 615, to include the computer program product of the present invention, or a part thereof (e.g. modules). The code, or modules, which are stored in the device memory 640, comprise, for example: the virtual and consideration accounting module, the customization parameter module, etc. or mobile application computer code that enables electronically accessing these modules and other functions-features of the present invention on the server 500.

User electronic computing devices 570, 580 further comprise a graphics processing unit (GPU) 620 and a camera 680 (forward and reverse facing), a speaker and a microphone to film video and/or capture images to, for example: record an event that is part of a purchased product (e.g. an academic lecture); conduct a conference call between a buyer and a seller device; visit a tourist location or musical concert; perform a comedic routine; etc.

Devices 570, 580 further comprise: a transceiver means 670 (e.g. Bluetooth®) and a wireless connector 672 with the ability to transmit and receive electronic communications via Internet and/or cellular connectivity using network (FIG. 5A, 110), such as a wireless network, including, but not limited to, data wireless networks, voice wireless networks, and networks that support both voice and data communications.

Devices 570, 580 further comprise: a rechargeable battery 690; and a means of inputting user data 660 using a touchscreen or pointer or click (e.g. keypad—hard or virtual; control elements; a graphical user interface—GUI; etc.). Thus, the user input may comprise hard keyboard input (e.g. PDA, tablet with attached keyboard, etc.); or a touch screen input. In an embodiment, the device display 660 may be coupled to a touch-sensitive overlay and an electronic controller that together comprise a touch-sensitive display. The user interacts with the GUI 660 through the touch-sensitive overlay; and the CPU 615 interacts with the touch-sensitive overlay via the electronic controller.

Devices 570, 580 may further comprise a global positioning system (GPS) unit 622 for limiting the geographic location of the seller and/or buyer when advertising and delivering a product for sale to potential user-buyers of the system.

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques disclosed herein may be stored on a (non-transitory) machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and diagrams disclosed herein illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

EXEMPLIFICATIONS

In practice, the user would be given an incentive to sign up with the social sharing and trading system based on virtual consideration by offering them free initial App coins. The amount may vary and could be linked to promotional events. As an example, new users would be given 1000 App coins and the users are able to transfer and keep track of their App coins by signing in to the user interface which may be a computer, tablet, smart phone or other suitable interface device as discussed above.

In a first example, a user could require a baby sitter to watch his/her children. The user is able to specify the date and location of the babysitting, amount of App coins he/she is willing to trade and the length of time required or any other information the user thinks is important. Members willing to accept would notify the user or the member may make a counter offer. Other pertinent information could be available such as background check or referrals and recommendations.

To illustrate a second example, a user wants to dispose of old bedroom furniture after buying new. The user would list the furniture specifying the App coins desired and posting a video showing the furniture. The user may specify who sees the offer based on location or a friends list. The user gets the App coins transferred to his/her account and those App coins are deducted from the buyer's account. The user may use the App coins gained to trade for other goods or services such as, but not limited to babysitter, food, etc.

The user is able select who sees the offer based on many criteria such as (a) direct friends only; (b) friends of friends, etc.; (c) all members; (d) selected members based on selected criteria such as; within a certain distance, same town, etc.; (e) members with a given characteristic for example; plumbers, locksmith, electricians, babysitters, computer tech, taxi drivers and so forth; or (f) having certain goods for sale (bicycles, dining room tables, office goods, and the like).

The system may be integrated with global positioning system (GPS) capability allowing the user to specify a location. For example, the user may select "within a 50 mile radius", etc. Multiple criteria may be selected by the user such as within 50 miles and not exceeding 2000 App coins.

The user may create specific groups to further define and discriminate among users and invite qualified members to join the specific group. As an example, the user is looking for a painter to paint his apartment. The user creates a painting group and then invites all painters within a specified geographic area to join the group. He then posts the job only to that group, thereby creating a directed pool of qualified candidates.

The social sharing and trading system based on virtual consideration allows users to earn App coins in various ways. As discussed above, new users signing up receive a welcoming bonus. Special promotions may be run to generate marketing opportunities. Users getting friends to sign up may receive a bonus allotment of App coins per person signed up. Additional opportunities for users can include browsing, watching videos, advertising content, signing up for special offers so that the more active the user is, the more App coins the user can earn. Additionally, a user could buy App coins using real currency, for example, a user could be offered 200 App coins for $100.00 US dollars. The user could pay for the App coins using a credit card, or other money transfer means as is known in the art. Of course other currencies may be used for the exchange.

Special promotions or tasks may be assigned to the user to allow them to earn additional App coins. Activities may include uploading a video, photo, story, jokes, posting special messages such as Mother's Day greetings, birthday wishes, etc. or playing specially designed games. The promotions encourage the user to stay on site and within the system and can be tailored to specific groups.

Other promotions can include receiving App coins for donating to charities from a list of charities approved/offered by the site in a list therein.

Additionally, users can design their own profile page to allow them to express their individuality rather than every member having an identical or similar page. To maximize profitability, the users exchange App coins to make changes to personalize their pages. As an example, users could be allowed one background change and then they have to pay a small virtual fee to subsequently change the background again. The desire of users to be creative and to express their individuality will entice many users to change their pages often. Other personalizations may be offered such as uploading pictures, logos or personalized art work and users will pay a small virtual fee to do the personalization.

The users will have real-time communications with other members including video chat. This will allow professional services to be delivered without geographic limitations. For example, a psychologist can sell "live video consultations" or a lawyer may offer a consultation by video connection. Additionally, buyers and sellers can communicate and show the buyer the goods they are interested in.

In one embodiment, the user can leave recorded messages, rather than real-time communications, to advertise, promote or ask a question of another member. For example, the user could describe an item for sale by leaving an audio message with the potential buyer who would click on a button to hear the message describing the item. The audio message saves the user from having to write a description of the item, and personalizes the experience, as well as allowing potential buyers to hear a voice or video rather than just reading a text. The recorded message may be an audio only file or may include video as well. Additionally, personal messages could be recorded by a user and then a potential buyer could listen to the message when convenient, thus facilitating communication between members.

In one embodiment, a user may create a "smart list" by listing all the products and/or services desired along with any specific requirements such as location and the amount she will pay and the system will alert her whenever anything on her list becomes available.

OTHER EXAMPLES (A) A user creates a shopping list that includes: a desk, closet and bedroom furniture, and chooses a search to require the furniture to be within 10 kilometers from his/her home because of the size and weight of those items.

The search engine can set the color, size, condition, price range of the items and only sellers meeting those criteria would appear in the search results.

(B) A user is interested in having a document translated from Hebrew to American English and wants the services of a translator who speaks American-style English but knows both languages, the user can set a shopping list to limit the service provider to America and/or a person who speaks American-style English. Likewise, a user with another translation requirement can set criteria to limit service bidders to certain countries.

(C) A user is looking for an apartment for rent in a particular resort town for a weekend and wants to pay no more than 200 App coins per day. The user sets the search criteria to automatically receive an alert when a bidder meets those criteria.

Although the instant invention has been described in relation to particular embodiments thereof, many other variations and modifications and other uses will become apparent to those skilled in the art.

CONCLUSION

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

What is claimed is:

1. A computer system comprising a non-transitory computer-readable storage media containing a program of instructions configured to cause the computer system to:
    register a buyer and a seller as users of the computer system to sell a first product or service using earned points and without using monetary currency as a form of payment;

gift a newly registered user one or more points to enable the new user to purchase the first product or service;

extract data from a buyer's system account of products the buyer is interested in buying;

transmit an automated alert to a buyer's electronic computing device when a system seller posts a product for sell that matches the buyer's interests;

electronically transfer one or more earned points from a buyer's account on a computer system, to a seller's account on the computer system as a form of payment for a seller's product;

receive a real-time video feed transmission from a seller's electronic computing device to the computer system or to a buyer electronic computing device while performing a purchased service;

wherein the seller may re-use the earned points to buy a second product or service advertised on the computer system; and wherein the first and second product are tangible or intangible goods or services, or any combination thereof.

2. The computer system of claim 1, further comprising generating and transmitting an electronic message comprising an offer for sale for the first or second product from a seller to a plurality of potential buyers.

3. The computer system of claim 2, further comprising instructions configured to cause the computer system to receive one or more of a buyer's bid to purchase the first or second product.

4. The computer system of claim 3, further comprising in response to a buyer's purchase bid, instructions configured to cause the computer system to generate and transmit one or more of: a user's acceptance; a user's refusal; or a user's counter-bid.

5. The computer system of claim 1, wherein the computer system enables a potential buyer to view an advertisement for the first or second product that meets a criteria selected by a potential buyer, wherein the criteria comprises one or more of: a range of costs; a shipping location; a seller with a computer system certified credentials; a seller with a computer system computed performance ratings; and a specific seller or classes of sellers.

6. The computer system of claim 1, wherein the seller maintains a webpage on the computer system viewable by a seller's selected list of potential buyers, and the webpage comprises advertisements for the seller's products.

7. The computer system of claim 1, wherein the first or second product comprises a video conference call between the buyer and seller via a computer system network.

8. A computer method for selling and purchasing products between a plurality of users of an online system, the method comprising the steps of:

registering a buyer and a seller as users of the online system to sell a product or service using earned points and without using monetary currency as a form of payment;

gifting a newly registered user one or more points to enable the new user to purchase the product or service advertised on the online system by another user;

extracting, by the online system, data from a buyer's system account of products the buyer is interested in buying;

transmitting, by the online system, an automated alert to a buyer's electronic computing device when a system seller posts a product for sell that matches a buyer's interests;

generating and transmitting, by the online system, an electronic message on a user electronic computing device, the message comprising an offer for sale for a first product of tangible and or intangible goods or services, or any combination thereof, from a seller to a plurality of potential buyers;

receiving and displaying on the user electronic computing device one or more of a potential buyer's bid to purchase the first product;

generating and transmitting one or more electronic messages comprising: a user's acceptance; a user's refusal; or a user's counter-bid in response to the buyer's bid;

when the electronic message is the user's acceptance, then electronically transferring one or more earned points from a buyer's account on a computer system, to a seller's account on the computer system as a form of payment for the first product or service;

receiving a real-time video feed transmission from a seller's electronic computing device to the online system or to a buyer electronic computing device while performing a purchased service; and wherein the seller may re-use the earned points to buy a second product advertised on the computer system.

9. The computer method of claim 8, wherein the computer system enables a potential buyer to view advertisements for products that meet a criteria selected by the buyer, wherein the criteria comprise one or more of: a range of costs; a shipping location; a seller with a computer system certified credentials; a seller with a computer system computed performance ratings; and a specific seller or classes of sellers.

10. The computer method of claim 8, wherein the seller maintains a webpage on the computer system, and the webpage comprises an advertisement for a seller's products.

11. A computer system for purchasing products between registered users of an online computer system without using currency, comprising:

a processor;

a non-transitory computer-readable memory;

a plurality software units installed in the memory and executable by the processor to:

match a plurality of registered product sellers with a plurality of registered product buyers;

gift a newly registered user points to enable the new user to purchase a product or a service advertised on the computer system by another user;

extract data from a buyer's system account of products the buyer is interested in buying, and transmit an automated alert to a buyer electronic computing device when a system seller posts a product for sell that matches a buyer's interests;

determine an amount of points to transfer from a buyer's system account to a seller's system account upon a purchase of a first product or service, and to transfer the points;

receive a real-time video feed transmission from a seller's electronic computing device to the online system or to the buyer electronic computing device while performing a purchased service;

wherein a seller may re-use the points transferred into the seller's system account to buy a second product advertised on the computer system by a registered system user; and wherein the product comprises a tangible or intangible good or service, or any combination thereof.

12. The computer system of claim 11, wherein the first determination unit further comprises at least one customization parameter to enable the seller to limit electronically transmitting or displaying an offer to a potential buyer, or a class of buyers, that are designated by the seller.

13. The computer system of claim 12, wherein the seller selected potential buyers comprise one or more of: a direct friend only; a friend of friends; all registered system users; and all registered system users that the computer system has determined to possess a need for the product.

14. The computer system of claim 11, wherein the first determination unit further comprises customization parameters to enable the seller to limit conditions for the delivery of the product, comprising one or more factors of: a date and time; a geographic location; a distance from the seller; a quantity ordered; or any combination thereof.

15. The computer system of claim 11, wherein the system charges the seller points for having the ability to upload a video and a photo that advertise the seller's products on a seller's computer system webpage.

* * * * *